(12) United States Patent
Chaudhry

(10) Patent No.: US 10,034,579 B2
(45) Date of Patent: Jul. 31, 2018

(54) INSULATED COOKING POT WITH COVER

(71) Applicant: Afzal M. Chaudhry, Somerset, NJ (US)

(72) Inventor: Afzal M. Chaudhry, Somerset, NJ (US)

(*) Notice: Subject to any disclaimer, the term of this patent is extended or adjusted under 35 U.S.C. 154(b) by 212 days.

(21) Appl. No.: 14/944,647

(22) Filed: Nov. 18, 2015

(65) Prior Publication Data

US 2016/0066746 A1   Mar. 10, 2016

Related U.S. Application Data

(63) Continuation-in-part of application No. 13/592,315, filed on Aug. 22, 2012, now abandoned.

(60) Provisional application No. 61/460,769, filed on Sep. 4, 2011.

(51) Int. Cl.
*A47J 27/00* (2006.01)
*A47J 36/06* (2006.01)
*A47J 41/02* (2006.01)
*A47J 36/02* (2006.01)

(52) U.S. Cl.
CPC .......... *A47J 41/024* (2013.01); *A47J 27/002* (2013.01); *A47J 36/06* (2013.01); *A47J 41/022* (2013.01)

(58) Field of Classification Search
CPC ........ A47J 41/024; A47J 27/002; A47J 36/06; A47J 41/022
USPC ... 220/592.21, 592.27, 592.22, 62.13, 62.15, 220/62.18, 573.1
See application file for complete search history.

(56) References Cited

U.S. PATENT DOCUMENTS

| | | | | |
|---|---|---|---|---|
| 2,727,649 | A * | 12/1955 | Piantanida | B65D 81/18 220/592.01 |
| 3,777,094 | A * | 12/1973 | Peters, Jr. | A47J 36/04 206/457 |
| 3,979,572 | A * | 9/1976 | Ito | A47J 36/02 219/621 |
| 4,653,469 | A * | 3/1987 | Miyaji | A47J 27/002 126/390.1 |
| 5,228,384 | A * | 7/1993 | Kolosowski | A47J 27/10 126/369 |
| 5,643,485 | A * | 7/1997 | Potter | A47J 27/002 126/375.1 |
| 6,305,272 | B1 * | 10/2001 | Lin | A47J 27/002 126/369 |
| 2006/0219724 | A1 * | 10/2006 | Melnik | A47J 27/00 220/592.27 |

(Continued)

FOREIGN PATENT DOCUMENTS

CH          678263 A5 *  8/1991  ........... A47J 27/002

*Primary Examiner* — J. Gregory Pickett
*Assistant Examiner* — Niki M Eloshway

(57) ABSTRACT

A double-walled insulated cooking pot has a food vessel, a sleeve positioned around the food vessel, a first insulator, and a second insulator. The insulators are affixed between the food vessel's wall(s) and the sleeve. The outer surface of the wall(s), the inner surface of the sleeve, and the insulators define a vacuum space. An insulated cover for the cooking pot has an upper layer, a lower layer, and a cover insulator. The cover insulator is sealingly engaged with an outer edge of an inner surface of the upper layer and an inner surface of the lower layer. The upper layer, the lower layer, and the cover insulator define a vacuum space within the cover. The pot and cover can be constructed such that the surfaces of the vacuum spaces are reflective.

19 Claims, 2 Drawing Sheets

(56) References Cited

U.S. PATENT DOCUMENTS

| | | | |
|---|---|---|---|
| 2011/0198358 A1* | 8/2011 | Parent | A47J 36/02 220/573.1 |
| 2012/0118896 A1* | 5/2012 | Lei | A47J 27/002 220/573.1 |
| 2013/0056474 A1* | 3/2013 | Chaudhry | A47J 41/022 220/573.1 |

* cited by examiner

INSULATED COOKING POT WITH COVER

CROSS-REFERENCE TO RELATED APPLICATION(S)

The present application is a continuation-in-part application of application Ser. No. 13/592,315 filed on Aug. 22, 2012, entitled "ENERGY SAVER COOKING POT", which claims benefit of U.S. Provisional Application No. 61/460,769 filed on Sep. 4, 2011, the entire disclosures of which are incorporated by reference herein.

BACKGROUND OF THE INVENTION

1. Field of Invention

The present invention relates to the field of insulated cooking pots for use on a stovetop or other cooking surface.

2. Description of Related Art

In the process of cooking, thermal energy is lost from the outer surfaces of cooking pots and their covers by conduction, convection, and radiation processes. Insulating the outer surfaces of the cooking pot and the corresponding cover would eliminate a large majority of this energy loss. Furthermore, the use of insulated cooking pots and covers would expedite the cooking process, and as a result, reduce the energy expenses of the user.

Based on the foregoing, there is a need in the art for an insulated, vacuum-sealed cooking pot and cover to prevent unnecessary heat loss.

SUMMARY OF THE INVENTION

The insulated cooking pot has a food vessel with a base and one or more walls extending upward from the base, a sleeve positioned around the one or more walls, a first insulator, and a second insulator. The insulators are affixed between an outer surface of the one or more walls and an inner surface of the sleeve, such that the first insulator is positioned higher than the second insulator. A vacuum space is defined by the insulators, the one or more walls' outer surface extending between the insulators, and the sleeve's inner surface extending between the insulators.

In an embodiment, a lower end of the sleeve is positioned at a point higher than the base.

In an embodiment, one or more surfaces defining the vacuum space are reflective.

In an embodiment, the first insulator and the second insulator are constructed of an insulating material such as glass or ceramic.

In an embodiment, channels extend into an upper portion and a lower portion of the one or more walls' outer surface and the sleeve's inner surface. The first insulator and the second insulator are positioned, or seated, within the channels.

In an embodiment, an epoxy is used to permanently affix the first insulator and the second insulator between an outer surface of the one or more walls and an inner surface of the sleeve.

In an embodiment, the food vessel and the sleeve are each constructed of one or more layers of metal.

In an embodiment, one or more exterior surfaces of the cooking pot, exclusive of the vacuum space, are coated with enamel.

In an embodiment, the interior surface of the food vessel is coated with a non-stick coating such as Teflon® or enamel.

In an embodiment, one or more handles extend outwardly from the sleeve.

In an embodiment, one or more handles extend outwardly from the food vessel.

A cover for an insulated cooking pot has an upper layer, a lower layer, and a cover insulator. The cover insulator is sealingly engaged with an outer edge of an inner surface of the upper layer and an inner surface of the lower layer. The upper layer's inner surface, the lower layer's inner surface, and the cover insulator define a vacuum space within the cover.

In an embodiment, the upper layer's inner surface and the lower layer's inner surface are reflective.

In an embodiment, the cover insulator is constructed of an insulating material such as glass or ceramic.

In an embodiment, channels extend into the outer edge of the upper layer's inner surface and the lower layer's inner surface. The cover insulator is positioned, or seated, within the channels.

In an embodiment, the cover insulator is permanently affixed to an outer edge of an inner surface of the upper layer and an inner surface of the lower layer with an epoxy.

In an embodiment, the upper layer and the lower layer are each constructed of one or more layers of metal.

In an embodiment, the exterior surface of the upper layer and the exterior surface of the lower layer are coated with enamel.

In an embodiment, one or more handles extend upwardly from the upper layer.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
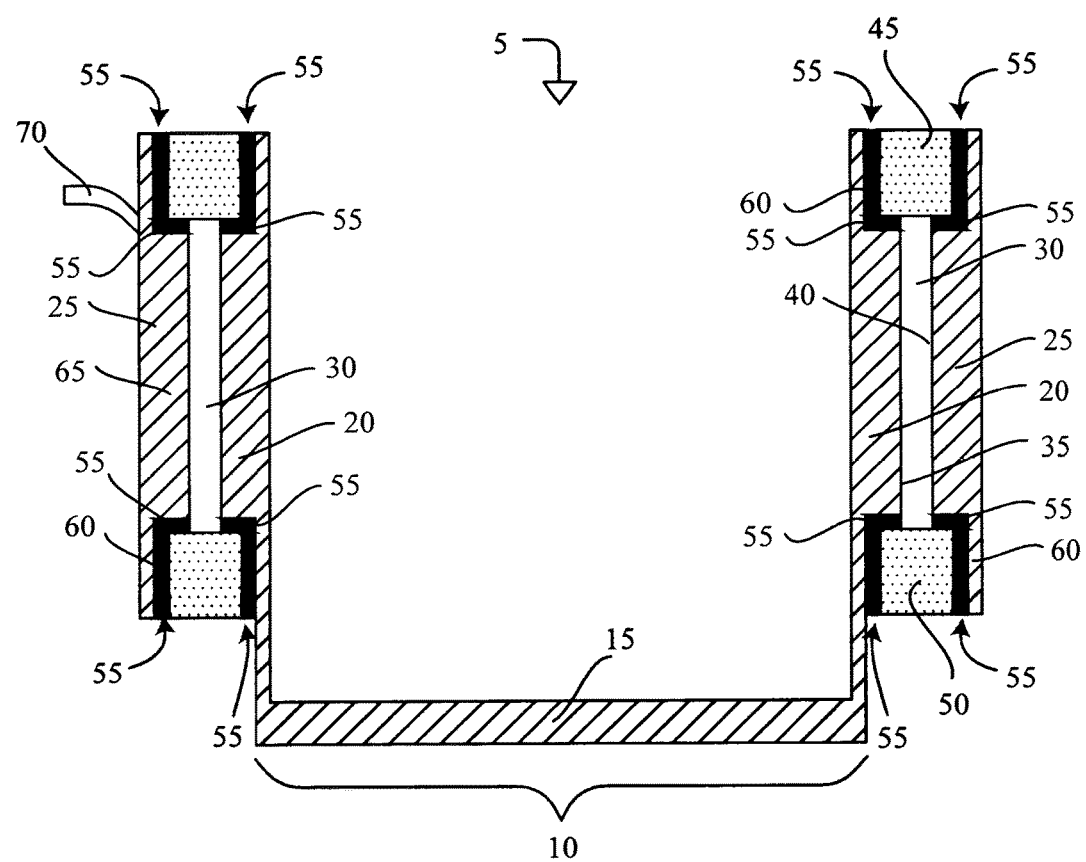
FIG. 1 is a cross-sectional view of an insulated cooking pot, according to an embodiment of the present invention.
Figure 2:
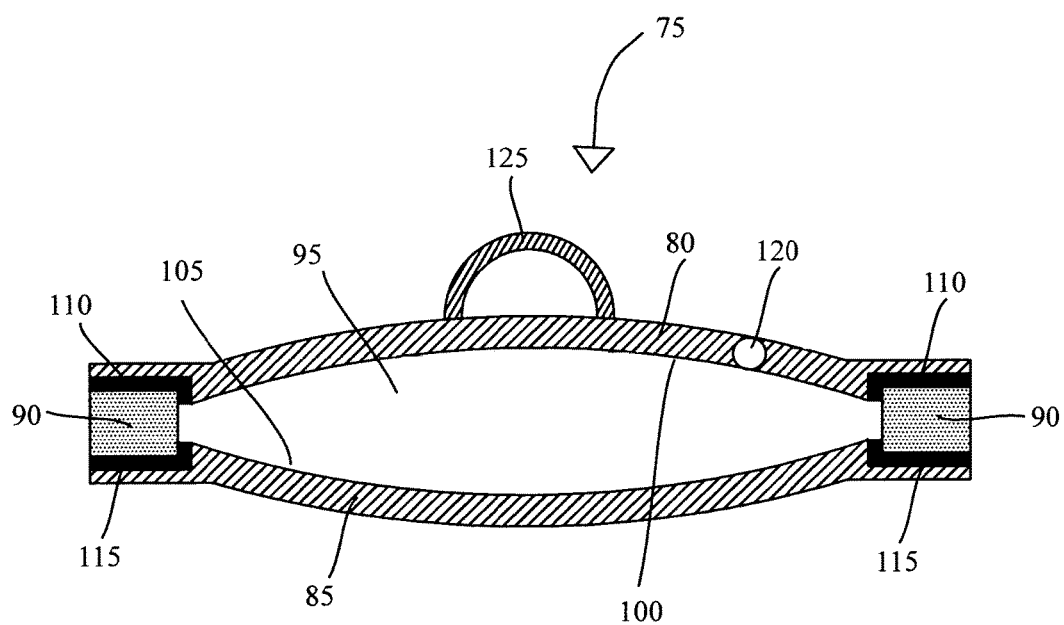
FIG. 2 is a cross-sectional view of an insulated cover for the insulated cooking pot, according to an embodiment of the present invention.

Preferred embodiments of the present invention and their advantages may be understood by referring to FIGS. 1-2, wherein like reference numerals refer to like elements.

With reference to FIG. 1, the insulated cooking pot 5 has a food vessel 10 defined by a base 15 and one or more walls 20 extending upward from the base 15. A sleeve 25 extends around the outer perimeter of the one or more walls 20 forming a space 30 between the one or more walls' outer surface 35 and the sleeve's inner surface 40 from the top of the sleeve 25 to the bottom of the sleeve 25. In a preferred embodiment, the top of the sleeve 25 laterally aligns with the top of the one or more walls, and extends downwardly to a point higher than the base 15. Alternatively, the sleeve 25 extends downwardly to a point adjacent to the base 15. A first insulator 45 and a second insulator 50 are permanently affixed to the one or more walls' outer surface 35 and the sleeve's inner surface 40 at the upper and lower ends of the space 30, respectively, to form an airtight seal between the one or more walls 20 and the sleeve 25. Once the airtight seal has been established, the air is evacuated from the space 30 to create a vacuum within the space 30.

In an alternative embodiment, the sleeve 25 extends downwardly from a point higher than the top of the one or more walls 20 to a point higher than or, alternatively, adjacent to the base 15.

In another alternative embodiment, the sleeve 25 extends downwardly from a point lower than the top of the one or more walls 20 to a point higher than or, alternatively, adjacent to the base 15.

In an embodiment, the one or more walls' outer surface 35 and the sleeve's inner surface 40 that correspond to the space 30 are highly polished, such that they provide high reflectivity and low emissivity. Due to the low emissivity of the one or more walls' outer surface 35, heat energy radiated through the vessel's one or more walls 20 and into the space 30 is drastically reduced. Furthermore, the heat energy that is radiated by the one or more walls' outer surface 35 reflects off of the sleeve's inner surface 40 and is reabsorbed through the one or more walls' outer surface 35. Thus, the high reflectivity and low emissivity of the one or more walls' outer surface 35 and the sleeve's inner surface 40 prevents the transfer of heat energy by radiation from the inside of the food vessel 10 to the exterior of the sleeve 25 while using the insulated cooking pot 5.

In an embodiment, the first insulator 45 and the second insulator 50 are constructed of glass or ceramic. The diameter of the first insulator 45, as compared to the diameter of the second insulator 50, varies depending on the desired shape of the insulated cooking pot 5. For example, in an embodiment, the diameter of the first insulator 45 is equal to the diameter of the second insulator 50. In another embodiment, the diameter of the first insulator 45 is greater than the diameter of the second insulator 50. In yet another embodiment, the diameter of the first insulator 45 is less than the diameter of the second insulator 50.

In an embodiment, channels 55 extend into an upper portion and a lower portion of the one or more walls' outer surface 35 and the sleeve's inner surface 40. The channels 55 serve as a seat in which the first insulator 45 and the second insulator 50 are positioned. In an embodiment, the first insulator 45 and the second insulator 50 are permanently affixed within the space 30 using a heat resistant epoxy 60, such as Loctite® epoxy adhesive.

In an embodiment, air is evacuated from the space 30 through a port 65 in the sleeve 25. Once the air has been fully evacuated, the port 65 is permanently sealed using welding techniques or, alternatively, by crushing the soft metal vacuum tube connected to the port 65. In an alternative embodiment, air is evacuated from the space 30 during the process of seating the first insulator 45 and the second insulator 50.

In an embodiment, the food vessel 10 and the sleeve 25 are constructed of metal. In a further embodiment, the food vessel 10 and the sleeve 25 are constructed of multiple bonded layers of metal, such that at least two of the layers are different metals having different properties, each of which is unique and beneficial to cooking In yet a further embodiment, the exterior of the food vessel 10, exclusive of the space 30, the exterior of the sleeve 25, and optionally, the interior of the food vessel 10 are coated with enamel.

In an embodiment, the food vessel's interior surface 67 is coated with a non-stick coating such as Teflon.

In an embodiment, one or more handles 70 extend outwardly from the sleeve 25. In an alternative embodiment, one or more handles 70 extend outwardly from the food vessel 10.

With reference to FIG. 2, a cover 75, i.e., a lid, for the insulated cooking pot 5 has an upper layer 80 and a lower layer 85. When the cover 75 is positioned on top of the insulated cooking pot 5, the lower layer 85 engages with one or more upper surfaces of the insulated cooking pot 5 and serves as a lid for the food vessel 10. A cover insulator 90 separates the upper layer 80 from the lower layer 85. The cover insulator 90 sealingly engages with the upper layer's inner surface 100 and the lower layer's inner surface 105 to form an airtight seal between the upper layer 80 and the lower layer 85. The upper layer's inner surface 100, the lower layer's inner surface 105, and the cover insulator 90 define a hollow interior 95 within the cover 75. Once the airtight seal has been established, the air is evacuated from the hollow interior 95 to create a vacuum within the hollow interior 95.

In an embodiment, the upper layer's inner surface 100 and the lower layer's inner surface 105 are highly polished, thus providing high reflectivity and low emissivity of the upper and lower layers' inner surfaces 100, 105. During the cooking process, the cover's lower layer 85 is heated by steam produced in the food vessel 10. Despite the heating of the lower layer 85, only a small amount of heat is radiated from the lower layer's inner surface 105 into the hollow interior 95 due to the low emissivity of the inner surface 105. Furthermore, the heat energy that is radiated by the lower layer's inner surface 105 reflects off of the upper layer's inner surface 100 and is reabsorbed by the lower layer's inner surface 105. Thus, the high reflectivity and the low emissivity of the lower layer's inner surface 105 and the upper layer's inner surface 100 prevent the transfer of heat energy by radiation from the inside of the food vessel 10 to the exterior of the cover 75.

In an embodiment, the cover insulator 90 is constructed of glass or ceramic.

In an embodiment, channels 110 extend into the outer edge of the upper layer's inner surface 100 and the lower layer's inner surface 105. The channels 110 serve as a seat in which the cover insulator 90 is positioned. In an embodiment, the cover insulator 90 is permanently affixed between the upper layer 80 and the lower layer 85 using a heat resistant epoxy 115, such as Loctite® epoxy adhesive.

In an embodiment, air is evacuated from the hollow interior 95 through a port 120 in the upper layer 80 or lower layer 85. Once the air has been fully evacuated, the port 120 is permanently sealed using welding techniques or, alternatively, by crushing the soft metal vacuum tube connected to the port 120. In an alternative embodiment, air is evacuated from the hollow interior 95 during the process of seating the cover insulator 90.

In an embodiment, the upper layer 80 and the lower layer 85 are constructed of metal. In a further embodiment, the upper layer 80 and the lower layer 85 are constructed of multiple bonded layers of metal, such that at least two of the layers are different metals having different properties, each of which is unique and beneficial to cooking In yet a further embodiment, the exterior surfaces of the upper layer 80 and the lower layer 85 are coated with enamel.

In an embodiment, one or more handles 125 extend upwardly from the upper layer 80.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:
1. An insulated cooking pot comprising:
   a) a cooking pot comprising:
      i) a food vessel having a base and one or more walls extending upwardly from the base;
      ii) a sleeve positioned around the one or more walls;
      iii) a first insulator; and
      iv) a second insulator, wherein the first insulator and the second insulator are positioned between the one or more walls and the sleeve, wherein the first insulator is positioned higher than the second insulator, wherein a vacuum space is defined by the first insulator, the second insulator, an outer surface of the one or more walls extending between the first insulator and the second insulator, and an inner surface of the sleeve extending between the first insulator and the second insulator; and
   b) a cover comprising:
      i) an upper layer;
      ii) a lower layer configured to matingly engage with one or more upper surfaces of the cooking pot; and
      iii) a cover insulator positioned between the upper layer and the lower layer along an outer edge of the upper layer and the lower layer, wherein a vacuum space is defined by the upper layer, the lower layer, and the cover insulator;
   wherein a plurality of channels extend into an upper portion and a lower portion of the outer surface of the one or more walls and the inner surface of the sleeve, wherein the first insulator and the second insulator are permanently affixed within the plurality of channels.

2. The insulated cooking pot of claim 1, wherein a lower end of the sleeve extends upwardly from a point higher than the base.

3. The insulated cooking pot of claim 1, wherein the outer surface of the one or more walls extending between the first insulator and the second insulator are reflective, and wherein the inner surface of the sleeve extending between the first insulator and the second insulator are reflective.

4. The insulated cooking pot of claim 1, wherein the first insulator and the second insulator are constructed of a material selected from the group consisting of glass and ceramic.

5. The insulated cooking pot of claim 1, wherein the first insulator and the second insulator are affixed between the outer surface of the one or more walls and the inner surface of the sleeve with an epoxy.

6. The insulated cooking pot of claim 1, wherein the food vessel and the sleeve are each constructed of two or more layers of metal and wherein at least two layers of the two or more layers are different metals having different properties.

7. The insulated cooking pot of claim 1, wherein one or more exterior surfaces of the cooking pot are coated with enamel.

8. The insulated cooking pot of claim 1, wherein an interior surface of the food vessel is coated with a non-stick coating.

9. The insulated cooking pot of claim 1, wherein one or more handles extend outwardly from the sleeve.

10. The insulated cooking pot of claim 1, wherein one or more handles extend outwardly from the food vessel.

11. The insulated cooking pot of claim 1, wherein an inner surface of the upper layer and an inner surface of the lower layer are reflective.

12. The insulated cooking pot of claim 1, wherein the cover insulator is constructed of a material selected from the group consisting of glass and ceramic.

13. The insulated cooking pot of claim 1, wherein the cover insulator is permanently affixed to the upper layer and the lower layer with an epoxy.

14. The insulated cooking pot of claim 1, wherein the upper layer and the lower layer are each constructed of two or more layers of metal and wherein at least two layers of the two or more layers are different metals having different properties.

15. The insulated cooking pot of claim 1, wherein an exterior surface of the upper layer and an exterior surface of the lower layer are coated with enamel.

16. The insulated cooking pot of claim 1, wherein one or more handles extend upwardly from the upper layer.

17. The insulated cooking pot of claim 1, wherein the first insulator and the second insulator are constructed of a material selected from the group consisting of glass and ceramic and wherein the food vessel and the sleeve are each constructed of one or more layers of metal.

18. The insulated cooking pot of claim 17, wherein the outer surface of the one or more walls extending between the first insulator and the second insulator are reflective;
   wherein the inner surface of the sleeve extending between the first insulator and the second insulator are reflective; and
   wherein heat energy radiated by the outer surface of the one or more walls reflects off the inner surface of the sleeve and is reabsorbed through the outer surface of the one or more walls.

19. An insulated cooking pot comprising:
   a) a cooking pot comprising:
      i) a food vessel having a base and one or more walls extending upwardly from the base;
      ii) a sleeve positioned around the one or more walls;
      iii) a first insulator; and
      iv) a second insulator, wherein the first insulator and the second insulator are positioned between the one or more walls and the sleeve, wherein the first insulator is positioned higher than the second insulator, wherein a vacuum space is defined by the first insulator, the second insulator, an outer surface of the one or more walls extending between the first insulator and the second insulator, and an inner surface of the sleeve extending between the first insulator and the second insulator; and
   b) a cover comprising:
      i) an upper layer;
      ii) a lower layer configured to matingly engage with one or more upper surfaces of the cooling pot; and
      iii) a cover insulator positioned between the upper layer and the lower layer along an outer edge of the upper layer and the lower layer, wherein a vacuum space is defined by the upper layer, the lower layer, and the cover insulator;
   wherein a plurality of channels extend into the outer edge of an inner surface of the upper layer and an inner surface of the lower layer, wherein the cover insulator is positioned within the plurality of channels.

* * * * *